(12) United States Patent
Ruhland et al.

(10) Patent No.: US 9,671,221 B2
(45) Date of Patent: Jun. 6, 2017

(54) PORTABLE DEVICE FOR OPTICALLY MEASURING THREE-DIMENSIONAL COORDINATES

(71) Applicant: FARO Technologies, Inc., Lake Mary, FL (US)

(72) Inventors: Axel Ruhland, Stuttgart (DE); Rolf Heidemann, Stuttgart (DE); Reinhard Becker, Ludwigsburg (DE); Martin Ossig, Tamm (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 35 days.

(21) Appl. No.: 14/826,859

(22) Filed: Aug. 14, 2015

(65) Prior Publication Data

US 2016/0069670 A1 Mar. 10, 2016

Related U.S. Application Data

(63) Continuation-in-part of application No. 14/712,993, filed on May 15, 2015, and a continuation-in-part of application No. 14/722,219, filed on May 27, 2015.
(Continued)

(30) Foreign Application Priority Data

| Sep. 10, 2014 | (DE) | 10 2014 013 677 |
| Sep. 10, 2014 | (DE) | 10 2014 113 015 |
| Oct. 9, 2014 | (DE) | 10 2014 013 678 |

(51) Int. Cl.
*G01B 11/30* (2006.01)
*G01B 11/25* (2006.01)
(Continued)

(52) U.S. Cl.
CPC ........ *G01B 11/2545* (2013.01); *G01B 11/002* (2013.01); *H04N 13/0055* (2013.01); *H04N 13/0239* (2013.01); *H04N 13/0242* (2013.01)

(58) Field of Classification Search
CPC . G01B 11/2545; G01B 11/002; G01B 11/245; G01B 11/25; H04N 13/0055;
(Continued)

(56) References Cited

U.S. PATENT DOCUMENTS

| 9,196,067 B1 | 11/2015 | Freed |
| 9,372,265 B2 | 6/2016 | Zweigle et al. |

(Continued)

FOREIGN PATENT DOCUMENTS

| AT | 506110 A1 | 6/2009 |
| DE | 2950138 A1 | 6/1981 |

(Continued)

OTHER PUBLICATIONS

Notification of Transmittal of the International Search Report for International Application No. PCT/US2015/041702 dated Sep. 23, 2015; Mailed Oct. 12, 2015; 4 pages.
(Continued)

*Primary Examiner* — Tri T Ton
(74) *Attorney, Agent, or Firm* — Cantor Colburn LLP

(57) ABSTRACT

A device for scanning and obtaining three-dimensional coordinates is provided. The device may be a hand-held scanner that includes a carrying structure having a front and reverse side, the carrying structure having a first arm, a second arm and a third arm arranged in a T-shape or a Y-shape. A housing is coupled to the reverse side, a handle is positioned opposite the carrying structure, the housing and carrying structure defining an interior space. At least one projector is configured to project at least one pattern on an object, the projector being positioned within the interior
(Continued)

space and oriented to project the at least one pattern from the front side. At least two cameras are provided spaced apart from each other, the cameras being configured to record images of the object. The cameras and projector are spaced apart from each other by a pre-determined distance.

18 Claims, 8 Drawing Sheets

Related U.S. Application Data

(60) Provisional application No. 62/161,461, filed on May 14, 2015.

(51) Int. Cl.
*G01B 11/00* (2006.01)
*H04N 13/00* (2006.01)
*H04N 13/02* (2006.01)

(58) Field of Classification Search
CPC .......... H04N 13/0239; H04N 13/0242; H04N 13/0296; H04N 13/0037; H04N 13/0051; H04N 17/002; H04N 2013/0081; H04N 5/23293; H04N 5/77
USPC ..... 356/237.1–237.6, 239.1–239.8, 600–640
See application file for complete search history.

(56) References Cited

U.S. PATENT DOCUMENTS

| | | | |
|---|---|---|---|
| 9,383,587 | B2 | 7/2016 | Balogh |
| 2002/0015934 | A1 | 2/2002 | Rubbert et al. |
| 2007/0097381 | A1 | 5/2007 | Tobiason et al. |
| 2007/0171220 | A1 | 7/2007 | Kriveshko |
| 2007/0172112 | A1 | 7/2007 | Paley et al. |
| 2010/0034426 | A1 | 2/2010 | Takiguchi et al. |
| 2010/0095542 | A1 | 4/2010 | Ferrari |
| 2010/0134598 | A1* | 6/2010 | St-Pierre ............... G01C 11/02 348/47 |
| 2010/0134599 | A1 | 6/2010 | Billert et al. |
| 2011/0107611 | A1 | 5/2011 | Desforges et al. |
| 2011/0164037 | A1 | 7/2011 | Yoshida et al. |
| 2011/0188739 | A1 | 8/2011 | Lee et al. |
| 2012/0033069 | A1 | 2/2012 | Becker et al. |
| 2012/0062557 | A1 | 3/2012 | Dillon et al. |
| 2012/0327083 | A1 | 12/2012 | Nishimura et al. |
| 2013/0155058 | A1 | 6/2013 | Golparvar-Fard et al. |
| 2013/0218024 | A1 | 8/2013 | Boctor et al. |
| 2013/0335417 | A1 | 12/2013 | McQueston et al. |
| 2014/0015963 | A1 | 1/2014 | Klaas |
| 2014/0028805 | A1* | 1/2014 | Tohme ................. G01C 15/002 348/47 |
| 2014/0120493 | A1 | 5/2014 | Levin |
| 2014/0267623 | A1 | 9/2014 | Bridges et al. |
| 2014/0268108 | A1 | 9/2014 | Grau |
| 2015/0015701 | A1 | 1/2015 | Yu |
| 2015/0229907 | A1 | 8/2015 | Bridges et al. |
| 2015/0373321 | A1 | 12/2015 | Bridges |
| 2016/0073085 | A1 | 3/2016 | Hillebrand et al. |
| 2016/0073091 | A1 | 3/2016 | Hillebrand et al. |
| 2016/0073104 | A1 | 3/2016 | Hillebrand et al. |

FOREIGN PATENT DOCUMENTS

| | | |
|---|---|---|
| DE | 10149750 A1 | 9/2002 |
| DE | 10313223 A1 | 10/2004 |
| DE | 202012104890 U1 | 3/2013 |
| DE | 102012112322 A1 | 6/2014 |
| EP | 1882895 A1 | 1/2008 |
| EP | 2428764 A1 | 3/2012 |
| EP | 2620914 A2 | 7/2013 |
| EP | 2693300 A2 | 2/2014 |
| EP | 2728306 A1 | 5/2014 |
| WO | 2005103863 | 11/2005 |
| WO | 2009003225 A1 | 1/2009 |
| WO | 2010015086 A1 | 2/2010 |
| WO | 2012168322 A2 | 12/2012 |
| WO | 2013184340 A1 | 12/2013 |
| WO | 2013186160 A1 | 12/2013 |

OTHER PUBLICATIONS

Notification of Transmittal of the International Search Report for International Application No. PCT/US2015/041992 dated Sep. 30, 2015; Mailed Oct. 12, 2015; 5 pages.
Notification of Transmittal of the International Search Report for International Application No. PCT/US2015/045843 dated Sep. 30, 2015; Mailed Oct. 12, 2015; 5 pages.
Notification of Transmittal of the International Search Report for International Application No. PCT/US2015/048857 dated Nov. 18, 2015; Mailed Nov. 30, 2015; 5 pages.
Written Opinion of the International Searching Authority for Intermnational Application No. PCT/US2015/041702 dated Sep. 23, 2015; Mailed Oct. 12, 2015; 5 pages.
Written Opinion of the International Searching Authority for International Application No. PCT/US2015/041992 dated Sep. 30, 2015; Mailed Oct. 12, 2015; 7 pages.
Written Opinion of the International Searching Authority for International Application No. PCT/US2015/045843 dated Sep. 30, 2015; Mailed Oct. 12, 2015; 5 pages.
Written Opinion of the International Searching Authority for International Application No. PCT/US2015/048857 dated Nov. 18, 2015; Mailed Nov. 30, 2015; 7 pages.
Creaform Metrology Solutions, "Handy Scan 3D—The Truly Portable Metrology-Grade 3D Scanners" brochure, 7 pages.
Creaform, "Creaform Releases Completely Re-Engineered Handyscan 3D Portable Scanners", May 5, 2014, 1 page.
DE Office Action re Application No. 10 2014 113 015.4 dated Oct. 14, 2014, 5 pages.
Mandy, Yousef B., et al; "Projector Calibration Using Passive Stereo and Triangulation"; International Journal of Future Computer and Communication; vol. 2; No. 5; 385-390; Oct. 2013; 6 pgs.

* cited by examiner

PORTABLE DEVICE FOR OPTICALLY MEASURING THREE-DIMENSIONAL COORDINATES

CROSS REFERENCE TO RELATED APPLICATIONS (IF APPLICABLE)

The present application claims the benefit of German Patent Application 10 2014 113 015.4 filed on Sep. 10, 2014 entitled "Method for Optically Scanning and Measuring an Environment" and is also a continuation-in-part application of U.S. application Ser. No. 14/712,993 filed on May 15, 2015 entitled "A Device and Method For Optically Scanning and Measuring an Environment", which is a nonprovisional application of U.S. Provisional Application 62/161,461 filed on May 14, 2015 entitled "A Device and Method For Optically Scanning and Measuring an Environment." U.S. Ser. No. 14/712,993 further claims the benefit of German Patent Application 10 2014 013 677.9 filed on Sep. 10, 2014. The present application is further a continuation-in-part application of U.S. application Ser. No. 14/722,219 filed on May 27, 2015 entitled "Device and Method for Optically Scanning and Measuring an Environment and Method of Control", which is a nonprovisional application of the aforementioned U.S. Provisional Application 62/161,461. U.S. Ser. No. 14/722,219 claims the benefit of German Application 10 2014 013 678.7 filed on Sep. 10, 2014. The contents of all of which are incorporated by reference herein in their entirety.

BACKGROUND OF THE INVENTION

The subject matter disclosed herein relates to a portable scanner, and in particular to a portable scanner having a display.

A portable scanner includes a projector that projects light patterns on the surface of an object to be scanned. The position of the projector is determined by means of a projected, encoded pattern. Two (or more) cameras, the relative positions and alignment of which are known or are determined, can record images of the surface with a further, uncoded pattern. The three-dimensional coordinates (of the points of the pattern) can be determined by means of mathematical methods which are known per se, such as epipolar geometry.

In video gaming applications, scanners are known as tracking devices, in which a projector projects an encoded light pattern onto the target to be pursued, preferably the user who is playing, in order to then record this encoded light pattern with a camera and to determine the coordinates of the user. The data are represented on an appropriate display.

A system for scanning a scene, including distance measuring, may include, in its most simplest form, a camera unit with two cameras, and illumination unit and a synchronizing unit. The cameras, which may optionally include filters, are used for the stereoscopic registration of a target area. The illumination unit is used for generating a pattern in the target area, such as by means of a diffractive optical element. The synchronizing unit synchronizes the illumination unit and the camera unit. Camera unit and illumination unit can be set up in selectable relative positions. Optionally, also two camera units or two illumination units can be used.

BRIEF DESCRIPTION OF THE INVENTION

According to one aspect of the invention, a hand-held scanner for producing 3D scans of an object in the environment if provided. The scanner includes a carrying structure having a front side and a reverse side, the carrying structure having a first arm, a second arm and a third arm arranged in a T-shape or a Y-shape. A housing is coupled to the reverse side having a handle, the handle being positioned opposite the carrying structure, the housing and carrying structure defining an interior space. At least one projector is configured to project at least one pattern on the object, the at least one projector being positioned within the interior space and oriented to project the at least one pattern from the front side. At least two cameras are provided spaced apart from each other, the at least two cameras being configured to record images of the object, the at least two cameras being disposed within the interior space and oriented to record images through the front side, the at least two cameras and the at least one projector being spaced apart by a pre-determined distance from each other by the carrying structure.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
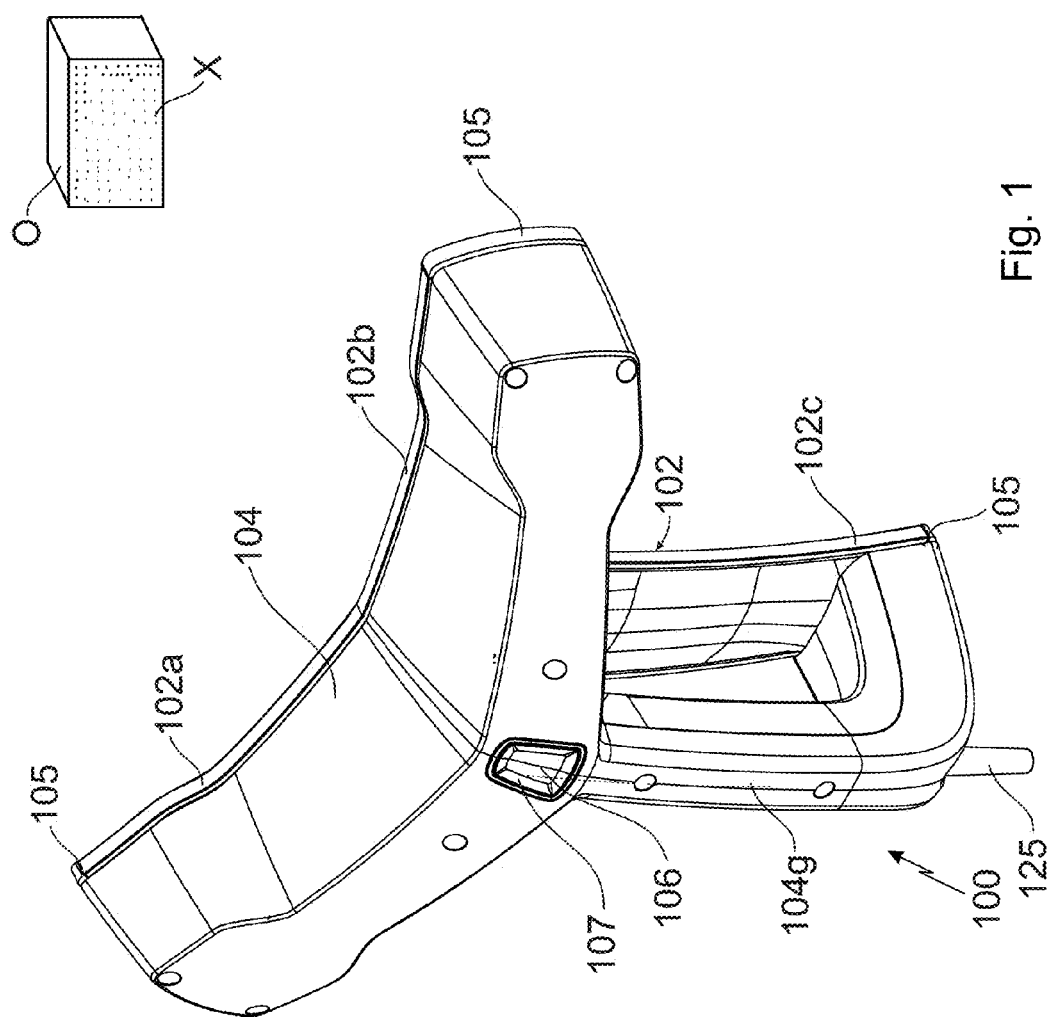
FIG. 1 shows a perspective view of a hand-held scanner and of an object in the environment.
Figure 2:
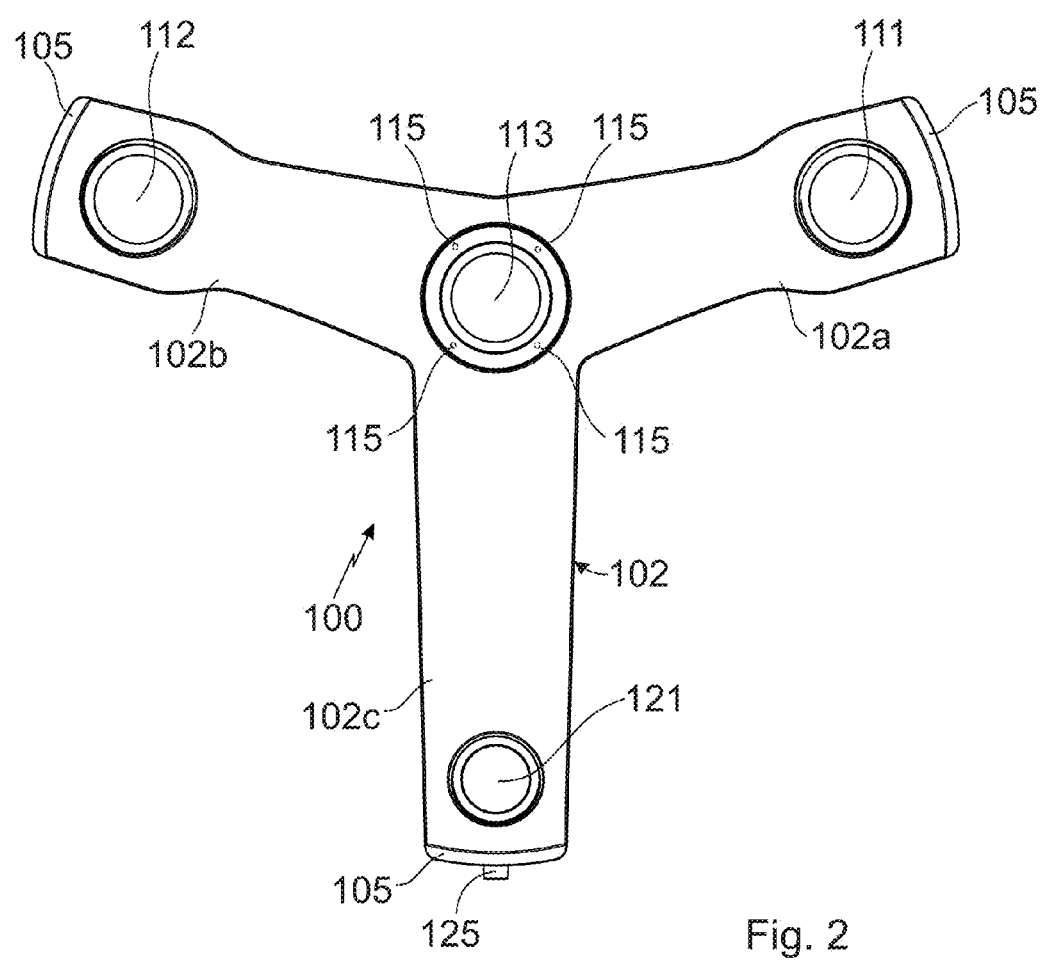
FIG. 2 shows a view of the front side of the hand-held scanner.
Figure 3:
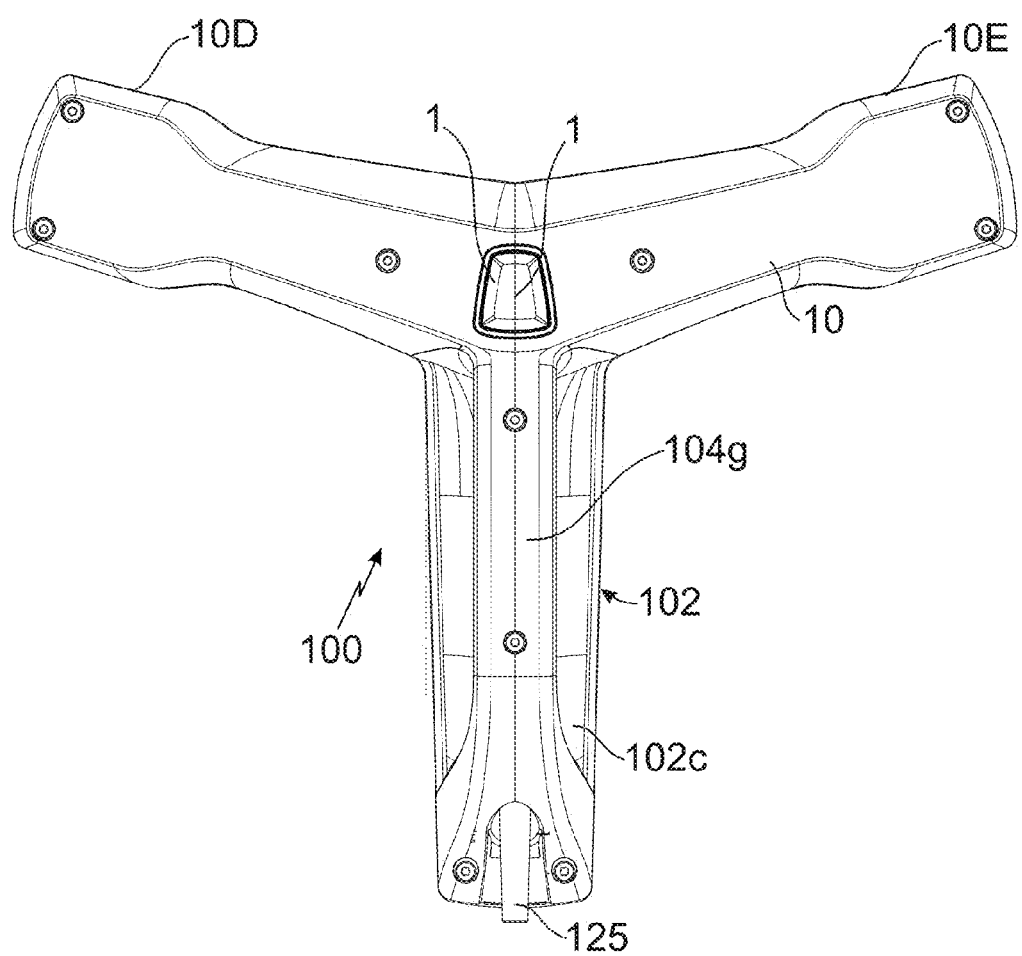
FIG. 3 shows a view of the reverse side of the hand-held scanner.
Figure 4:
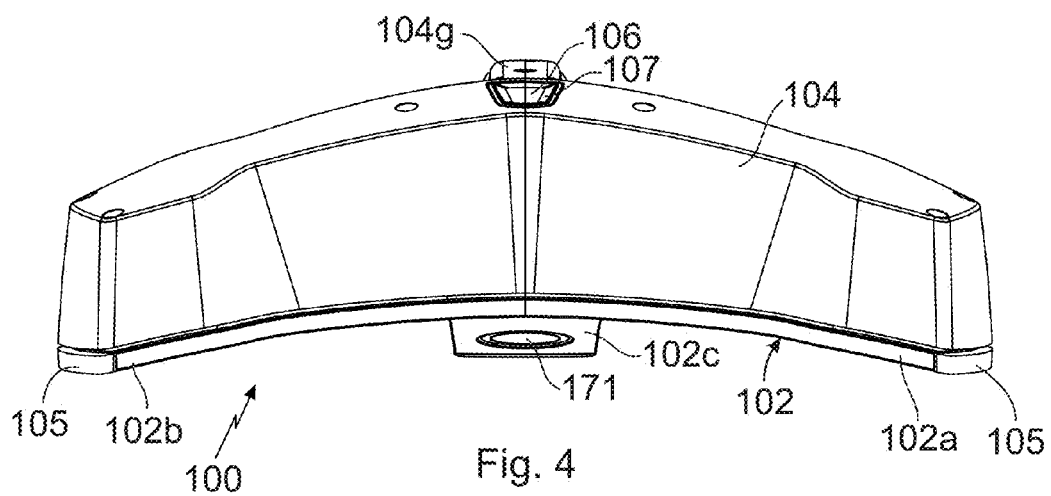
FIG. 4 shows a top view of the hand-held scanner from above.
Figure 5:
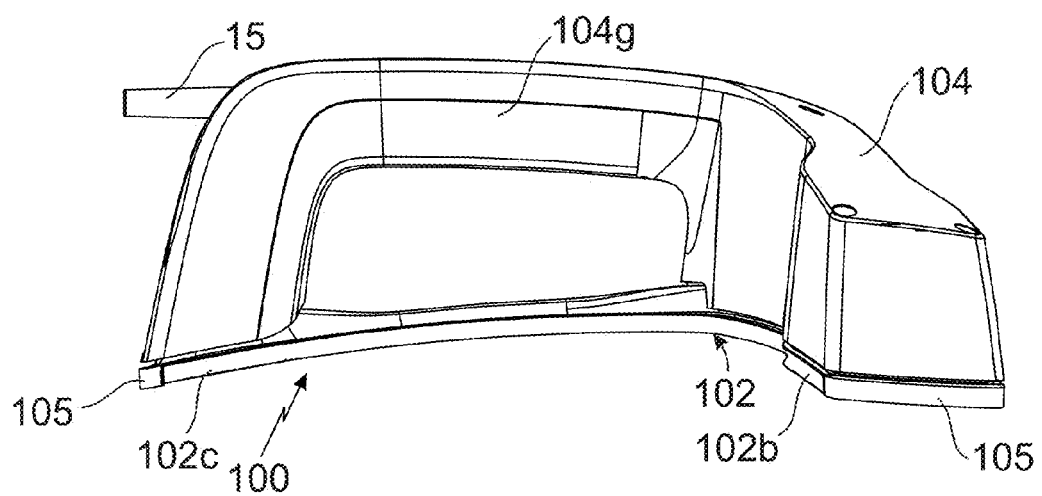
FIG. 5 shows a view of the hand-held scanner from the right side.
Figure 6:
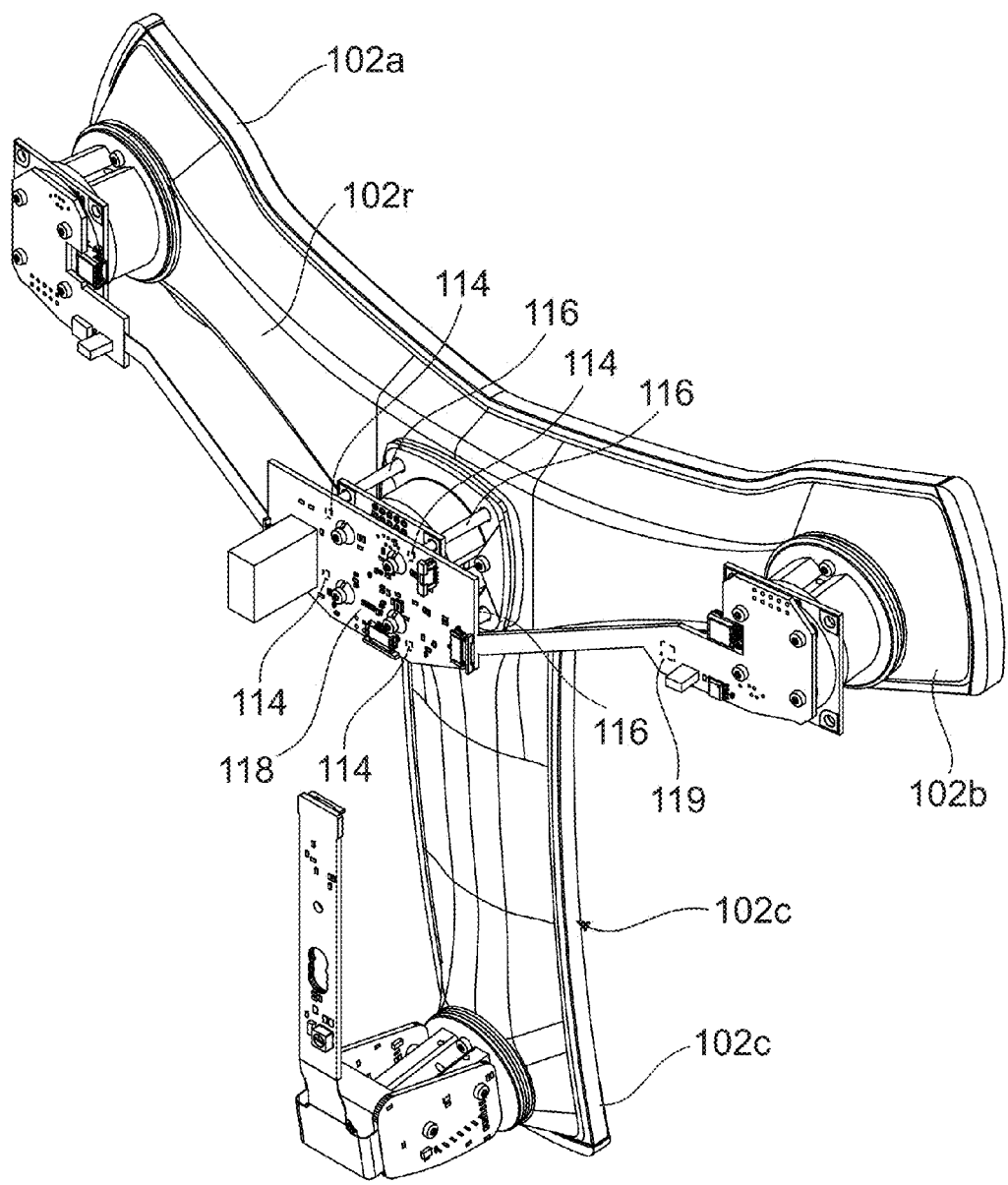
FIG. 6 shows a perspective view corresponding to FIG. 1 without housing.

The detailed description explains embodiments of the invention, together with advantages and features, by way of example with reference to the drawings.

DETAILED DESCRIPTION OF THE INVENTION

In one embodiment, the carrying structure is stable mechanically and thermally, defines the relative distances and the relative alignments of a camera and of a projector. The arrangement on a front side of the 3D measuring device faces on the environment, has the advantage that these distances and alignments are not changed by a change of the shape of a housing.

The term "projector" is defined to generally refer to a device for producing a pattern. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

Depending on the number of assemblies provided for distance measuring, a corresponding number of arms of the carrying structure is provided, which protrude from a common center located at the intersection of the arms. The assemblies, which may include a combination of cameras and projectors, are provided in the area of the ends of the assigned arms. The assemblies may be arranged each on the reverse side of the carrying structure. Their respective optics are directed through an assigned aperture in the carrying structure, so that the respective assemblies are operably oriented to face towards the environment from the front side. A housing covers the reverse side and forms the handle part.

In one embodiment, the carrying structure consists of a carbon-reinforced or a glass-fiber-reinforced matrix of synthetic material or ceramics (or of another material). The material provides for stability and a low weight and can, at the same time, be configured with viewing areas. A concave (spherical) curvature of the front side of the carrying structure does not only have constructive advantages, but it also protects the optical components arranged on the front side when the front surface of the 3D measuring device is placed on a work surface.

The projector produces the projected pattern, which may or may not be within the visible wavelength range. In one embodiment, the projected pattern has a wavelength in the infrared range. The two cameras are configured to acquire images from light within this wavelength range, while also filtering out scattered light and other interferences in the visible wavelength range. A color or 2D camera can be provided as third camera for additional information, such as color for example. Such camera records images of the environment and of the object being scanned. In an embodiment where the camera captures color, the point cloud generated from the scanning process (herein referred to as the "3D-scan") can have color values assigned from the color information contained in the color images.

During operation the 3D measuring device generates multiple 3D scans of the same scene, from different positions. The 3D scans are registered in a joint coordinate system. For joining two overlapping 3D scans, there are advantages in being able to recognizable structures within the 3D scans. Preferably, such recognizable structures are looked for and displayed continuously or, at least after the recording process. If, in a determined area, density is not at a desired level, further 3D scans of this area can be generated. A subdivision of the display used for representing a video image and the (thereto adjacent parts of the) three-dimensional point cloud helps to recognize, in which areas scan should still be generated.

In one embodiment, the 3D measuring device is designed as a portable scanner, i.e. it works at high speed and is of a size and weight suitable for carrying and use by a single person. It is, however, also possible to mount the 3D measuring device on a tripod (or on another stand), on a manually movable trolley (or another cart), or on an autonomously moving robot, i.e. that it is not carried by the user—optionally also by using another housing, for example without a carrying handle. It should be appreciated that while embodiments herein describe the 3D measuring device as being hand-held, this is for exemplary purposes and the claimed invention should not be so limited. In other embodiments, the 3D measuring device may also be configured as a compact unit, which are stationary or mobile and, if appropriate, built together with other devices.

Referring to FIGS. 1-6, a 3D measuring device 100 is provided as portable part of a device for optically scanning and measuring an environment of the 3D measuring device 100 with objects O. As used herein, the side of the device 100 which faces the user shall be referred to as the reverse side, and the side of the device 100 which faces the environment as the front side. This definition extends to the components of the 3D measuring device 100. The 3D measuring device 100 is provided (on its front side) visibly with a carrying structure 102 having three arms 102a, 102b, 102c. These arms give the carrying structure 102 a T-shape or a Y-shape, i.e. a triangular arrangement. The area in which the three arms 102a, 102b, 102c intersect and are connected with each other, and from which the three arms 102a, 102b, 102c protrude, defines the center of the 3D measuring device 100. From the user's view, the carrying structure 102 is provided with a left arm 102a, a right arm 102b and a lower arm 102c. In one embodiment, the angle between the left arm 102a and the right arm 102b is, for example, approximately 150°+20°, between the left arm 102a and the lower arm 102c approximately 105°+10°. The lower arm 102c is, in some embodiments, somewhat longer than the two other arms 102a, 102b.

The carrying structure 102 preferably is configured from fiber-reinforced synthetic material, such as a carbon-fiber-reinforced synthetic material (CFC). In another embodiment, the carrying structure 102 is made from carbon-fiber-reinforced ceramics or from glass-fiber-reinforced synthetic material. The material renders the carrying structure 102 mechanically and thermally stable and provides at the same time for a low weight. The thickness of the carrying structure 102 is considerably smaller (for example 5 to 15 mm) than the length of the arms 102a, 102b, 102c (for example 15 to 25 cm). The carrying structure 102 hence has a flat basic shape. In some embodiments, the arms 102a, 102b, 102c, may include a reinforced back near the center of the arm. It is, however, preferably not configured to be plane, but to be curved. Such curvature of the carrying structure 102 is adapted to the curvature of a sphere having a radius of approximately 1 to 3 m. The front side (facing the object 0) of the carrying structure 102 is thereby configured to be concave, the reverse side to be convex. The curved shape of the carrying structure 102 is advantageous for providing stability. The front side of the carrying structure 102 (and in one embodiment the visible areas of the reverse side) is configured to be a viewing area, i.e. it is not provided with hiders, covers, cladding or other kinds of packaging. The preferred configuration from fiber-reinforced synthetic materials or ceramics is particularly suitable for this purpose.

On the reverse side of the carrying structure 102, a housing 104 is arranged, which is connected with the carrying structure 102 within the area of the ends of the three arms 102a, 102b, 102c in a floating way, by means of appropriate connecting means, for example by means of rubber rings and screws with a bit of clearance. As used herein, a floating connection is one that reduces or eliminates the transmission of vibration from the housing 104 to the carrying structure 102. In one embodiment, the floating connection is formed by a rubber isolation mount disposed between the housing 104 and the carrying structure. In one embodiment, an elastomeric seal, such as rubber, is disposed between the outer perimeter of the carrying structure 102 and the housing 104. The carrying structure 102 and the housing 104 are then clamped together using elastomeric bushings. The seal and bushings cooperate to form the floating connection between the carrying structure 102 and the housing 104. Within the area of the left arm 102a and of the right arm 102b, the edge of the housing 104 extends into the immediate vicinity of the carrying structure 102, while the housing 104 extends from the center of the 3D measuring device 100 within the area of the lower arm 102c, at a distance to the carrying structure 102, forming a handle part 104g, bends off at the end of the handle part 104g and approaches the end of the lower arm 102c, where it is connected with it in a floating manner. The edge of the handle 104g extends into the immediate vicinity of the carrying structure 102. In some embodiments, sections of the carrying structure 102 may include a reinforced back 102r. The back 102r protrudes into the interior of the housing 104. The housing 104 acts as a hood to cover the reverse side of the carrying structure 102 and define an interior space.

The protective elements 105 may be attached to the housing 104 or to the carrying structure 102. In one embodiment, the protective elements 105 are arranged at the ends of and extend outward from the arms 102a, 102b, 102c to protect the 3D measuring device from impacts and from damage resulting thereof. When not in use, the 3D measuring device 100 can be put down with its front side to the bottom. Due to the concave curvature of the front side, on the 3D measuring device will only contact the surface at the ends of the arms 102a, 102b, 102c. In embodiments where the protective elements 105 are positioned at the ends of the arms 102a, 102b, 102c advantages are gained since the protective elements 105 will provide additional clearance with the surface. Furthermore, when the protective elements 105 are made from a soft material for example from rubber, this provides a desirable tactile feel for the user's hand. This soft material can optionally be attached to the housing 104, particularly to the handle part 104g.

On the reverse side of the 3D measuring device 100, an control actuator or control knob 106 is arranged on the housing 104, by means of which at least optical scanning and measuring, i.e. the scanning process, can be started and stopped. The control knob 106 is arranged in the center of the housing 104 adjacent one end of the handle. The control knob 106 may be multi-functional and provide different functions based on a sequence of actions by the user. These actions may time based (e.g. multiple button pushed within a predetermined time), or space based (e.g. the button moved in a predetermined set of directions), or a combination of both. In one embodiment, the control knob 106 may be tilted in several directions in (e.g. left, right, up, down). In one embodiment, around the control knob 106 there are at least one status lamp 107. In one embodiment, there may be a plurality of status lamps 107. These status lamps 107 may be used to show the actual status of the 3D measuring device 100 and thus facilitate the operation thereof. The status lamps 107 can preferably show different colors (for example green or red) in order to distinguish several status'. The status lamps 107 may be light emitting diodes (LEDs).

On the carrying structure 102, spaced apart from each other at a defined distance, a first camera 111 is arranged on the left arm 102a (in the area of its end), and a second camera 112 is arranged on the right arm 102b (in the area of its end). The two cameras 111 and 112 are arranged on the reverse side of the carrying structure 102 and fixed thereto, wherein the carrying structure 102 is provided with apertures through which the respective camera 111, 112 can acquire images through the front side of the carrying structure 102. The two cameras 111, 112 are preferably surrounded by the connecting means for the floating connection of the housing 104 with the carrying structure 102.

Each of the cameras 111, 112 have a field of view associated therewith. The alignments of the first camera 111 and of the second camera 112 to each other are adjusted or adjustable in such a way that the fields of view overlap to allow stereoscopic images of the objects O. If the alignments are fixed, there is a desired predetermined overlapping range, depending on the application in which the 3D measuring device 100 is used. Depending on environment situations, also a range of several decimeters or meters may be desired. In another embodiment, the alignments of the cameras 111, 112 can be adjusted by the user, for example by pivoting the cameras 111, 112 in opposite directions. In one embodiment, the alignment of the cameras 111, 112 is tracked and therefore known to the 3D measuring device 100. In another embodiment, the alignment is initially at random (and unknown), and is then determined, such as be measuring the positions of the camera's for example, and thus known to the 3D measuring device 100. In still another embodiment, the alignment is set and fixed during manufacturing or calibration of the 3D measurement device 100.

The first camera 111 and the second camera 112 are preferably monochrome, i.e. sensitive to a narrow wavelength range, for example by being provided with corresponding filters, which then filter out other wavelength ranges, including scattered light. This narrow wavelength range may also be within the infrared range. In order to obtain color information on the objects O, the 3D measuring device 100 preferably includes a 2D camera, such as color camera 113 which is preferably aligned symmetrically to the first camera 111 and to the second camera 112, and arranged in the center of the 3D measuring device 100, between the cameras 111, 112. The 2D camera 113 may include an image sensor that is sensitive to light in the visible wavelength range.

In order to illuminate the scene for the 2D camera, in the event of unfavorable lighting conditions, at least one, in the illustrated embodiment a light source, such as four (powerful) light-emitting diodes (LED) 114 are provided. One radiating element 115 is associated with each of the LEDs 114. The light emitted from the light-emitting diode 114 is deflected in correspondence with the alignment of the 3D measuring device 100, from the corresponding LED 114. Such a radiating element 115 can, for example, be a lens or an appropriately configured end of a light guide. The (in the illustrated embodiment four) radiating elements 115 are arranged equally around the color camera 113. Each LED 114 is connected with the assigned radiating element 115 by means of one light guide each. The LED 114 therefore can be structurally arranged at a control unit 118 of the 3D measuring device 100, such as by being fixed on a board thereof.

In order to later have a reference for the images recorded by the cameras 111,112, 113, a sensor such as an inclinometer 119 is provided. In one embodiment, the inclinometer 119 is an acceleration sensor (with one or several sensitive axes), which is manufactured in a manner known per se, as MEMS (micro-electro-mechanical system). As inclinometer 119, also other embodiments and combinations are possible. The data of the 3D measuring device 100 each have (as one component) a gravitation direction provided by the inclinometer 119.

During operation images are recorded by the first camera 111 and by the second camera 112. From these images three-dimensional data can be determined, i.e. 3D-scans of the objects O can be produced, for example by means of photogrammetry. The objects O, however, may have few structures or features and many smooth surfaces. As a result, the generation of 3D-scans from the scattered light of the objects O is difficult.

To resolve this difficulty, a projector 121 may be used, which is arranged at the lower arm 102c (in the area of its end). The projector 121 is arranged within the interior space on the reverse side of the carrying structure 102 and fixed thereto. The carrying structure 102 is provided with an aperture through which the projector 121 can project a pattern of light through the front side of the carrying structure 102. In one embodiment, the projector 121 is surrounded by the connecting means to provide a floating connection between the housing 104 with the carrying structure 102. The projector 121, the first camera 111, and the second camera 112 are arranged in a triangular arrangement with respect to each other and aligned to the environment of the 3D measuring device 100. The projector 121 is aligned in correspondence with the two cameras 111, 112. The relative alignment between the cameras 111, 112 and the projector 121 is preset or can be set by the user.

In one embodiment, the cameras 111, 112 and the projector 121 form an equilateral triangle and have a common tilt angle. When arranged in this manner, and if the field of view of the cameras 111, 112 and the projector 121 are similar, the centers of the field of view will intersect at a common point at a particular distance from the scanner 100. This arrangement allows for a maximum amount of overlap to be obtained. In embodiments where the tilt or angle of the cameras 111, 112 and projector 121 may be adjusted, the distance or range to the intersection of the fields of view may be changed.

If the user places 3D measuring device 100 on a surface on its front side, i.e. with the front side to the surface, the concave curvature of the front side creates a gap between the cameras 111, 112, 113 and the projector 121 from the surface, so that the respective lenses are protected from damage.

The cameras 111, 112, 113, the projector 121, the control knob 106, the status lamps 107, the light-emitting diodes 114 and the inclinometer 119 are connected with the common control unit 118, which is arranged inside the housing 104. This control unit 118 can be part of a control and evaluation device which is integrated in the housing. In an embodiment, the control unit 118 is connected with a standardized communication interface at the housing 104, the interface being configured for a wireless connection (for example Bluetooth, WLAN, DECT) as an emitting and receiving unit, or for a cable connection (for example USB, LAN), if appropriate also as a defined interface, such as that described in DE 10 2009 010 465 B3, the contents of which are incorporated by reference herein. The communication interface is connected with an external control and evaluation device 122 (as a further component of the device for optically scanning and measuring an environment of the 3D measuring device 100), by means of said wireless connection or connection by cable. In the present case, the communication interface is configured for a connection by cable, wherein a cable 125 is plugged into the housing 104, for example at the lower end of the handle part 104g, so that the cable 125 extends in prolongation of the handle part 104g.

The control and evaluation device 122 may include one or more processors 122a to carry out the methods for operating and controlling the 3D measuring device 100 and evaluating the measured data. The control and evaluation device 122 may be a portable computer (notebook) or a tablet (or smartphone) such as that shown in FIGS. 7 and 8, or any external or distal computer (e.g. in the web). The control and evaluation device 122 may also be configured in software for controlling the 3D measuring device 100 and for evaluating the measured data. However, the control and evaluation device 122 may be embodied in separate hardware, or it can be integrated into the 3D measuring device 100. The control and evaluation device 122 may also be a system of distributed components, at least one component integrated into the 3D measuring device 100 and one component externally. Accordingly, the processor(s) 122a for performing said methods may be embedded in the 3D measuring device 100 and/or in an external computer.

The projector 121 projects a pattern X, which it produces, for example by means of a diffractive optical element, on the objects to be scanned. The pattern X does not need to be encoded (that is to say single-valued), but it is preferably uncoded, for example periodically, that is to say multivalued. The multi-valuedness is resolved by the use of the two cameras 111, 112, combined with the available, exact knowledge of the shape and direction of the pattern.

The uncoded pattern X is preferably a point pattern, comprising a regular arrangement of points in a grid. In the present invention, for example, approximately one hundred times one hundred points are projected at an angle of approximately 50° to a distance of approx. 0.5 m to 5 m. The pattern X can also be a line pattern or a combined pattern of points and lines, each of which is formed by tightly arranged light points.

There is a relationship between the point density, the distance between the projector 121 and the object O and the resolution that can be obtained with the produced pattern X. With diffractive pattern generation, the light of one source is distributed over the pattern. In that case the brightness of the pattern elements depends on the number of elements in the pattern when the total power of the light source is limited. Depending on the intensity of the light scattered from the objects and the intensity of background light it may be determined whether it is desirable to have fewer but brighter pattern elements. Fewer pattern elements means the acquired point density decreases. It therefore seems helpful to be able to generate, in addition to pattern X, at least one other pattern. Depending on the generation of the patterns, a dynamic transition between the patterns and/or a spatial intermingling is possible, in order to use the desired pattern for the current situation. In an embodiment, the projector 121 may produce the two patterns offset to each other with respect to time or in another wavelength range or with different intensity. The other pattern may be a pattern which deviates from pattern X, such as an uncoded pattern. In the illustrated embodiment the pattern is a point pattern with a regular arrangement of points having another distance (grid length) to each other.

For reasons of energy efficiency and eye protection, the projector 121 produces the pattern X on the objects O only, when the cameras 111 and 112 (and if available 113) record images of the objects O which are provided with the pattern X. For this purpose, the two cameras 111, 112 and the projector 121 are synchronized, i.e. coordinated internally with each other, with regard to both, time and the pattern X used. Each recording process starts by the projector 121 producing the pattern X, similar to a flash in photography, and the cameras 111 and 112 (and, if available 113) following with their records, more particularly their pairs of records (frames), i.e. one image each from each of the two cameras 111, 112. The recording process can comprise one single frame (shot), or a sequence of a plurality of frames (video). Such a shot or such a video is triggered by means of the control knob 106. After processing of the data, each frame then constitutes a 3D-scan, i.e. a point cloud in the three-dimensional space, in relative coordinates of the 3D measuring device 100.

The data furnished by the 3D measuring device 100 are processed in the control and evaluation device 122, i.e. the 3D scans are generated from the frames. The 3D scans in turn are joined, i.e. registered in a joint coordinate system. For registering, the known methods can be used, i.e. natural or artificial targets (i.e. recognizable structures) can be localized and identified for example in overlapping areas of two 3D scans, in order to determine the assignment of the two 3D scans by means of corresponding pairs. A whole scene is thus gradually registered by the 3D measuring device 100. The control and evaluation device 122 is provided with a display 130 (display device), which is integrated or connected externally.

Figure 7:
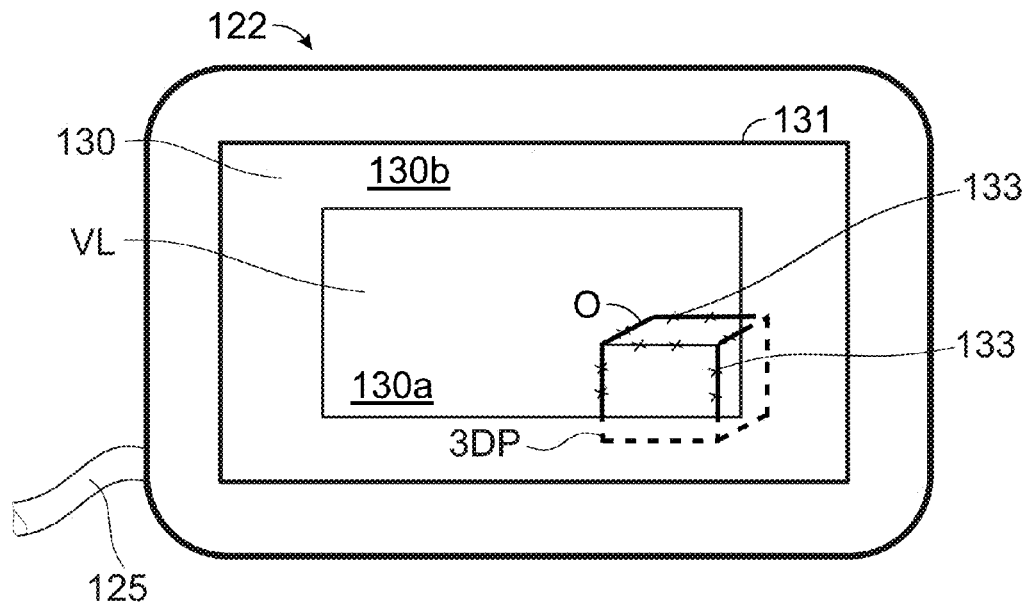
FIG. 7 shows a representation of the control and evaluation device with display.
Figure 8:
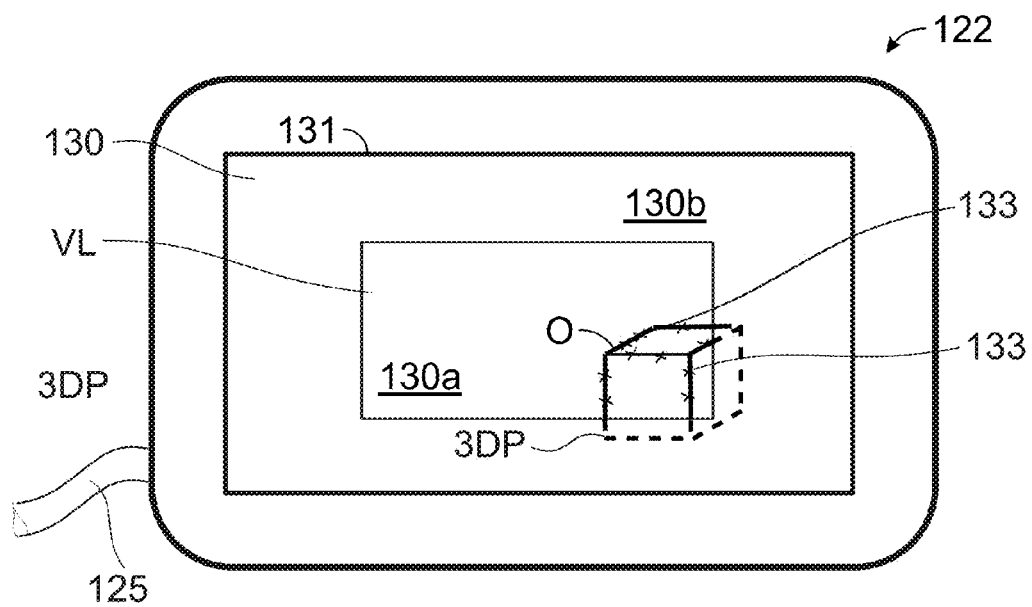
FIG. 8 shows a representation corresponding to FIG. 7, with a smaller scale of the video image.

One embodiment of the display 130 shown in FIG. 7 illustrates a subdivided image or subdivided screen. In this embodiment, the display 130 is divided into a first display part 130a and a second display part 130b. In the present embodiment, the first display part 130a is a (rectangular) central part of the display 130, and the second display part 130b is a peripheral area around the first display part 130a. In another embodiment, the two display parts may be columns. In the embodiment illustrated in FIGS. 7-9, the first display part 130a is shown as having a rectangular shape, however this is for exemplary purposes and the claimed invention should not be so limited. In other embodiments, the first display part 130a may have other shapes, including but not limited to circular, square, trapezoid (FIG. 10), trapezium, parallelogram, oval, triangular, or a polygon having any number of sides. In one embodiment, the shape of the first display part 130a is user defined or selectable.

In the first display part 130a a video live image VL is displayed, such as that captured by 2D camera 113 for example. In the second display part 130b, an image of the latest 3D scan (or a plurality of 3D scans that have been registered) is displayed as at least part of a view of the three-dimensional point cloud 3DP. The size of the first display part 130a may be variable, and the second display part 130b is arranged in the area between the first display part 130a and the border 131 of the display 130. As video live image VL changes, such as when the user moves the device 100, the image of the three-dimensional point cloud 3DP changes correspondingly to reflect the change in position and orientation of the device 100.

Figure 9:
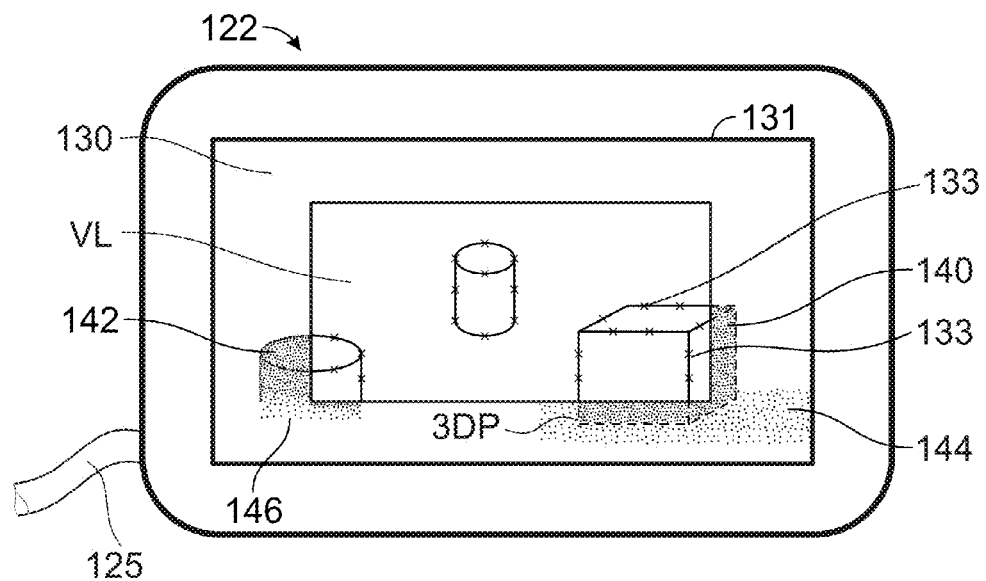
FIG. 9 shows a representation of the control and evaluation device with display in accordance with another embodiment.
Figure 10:
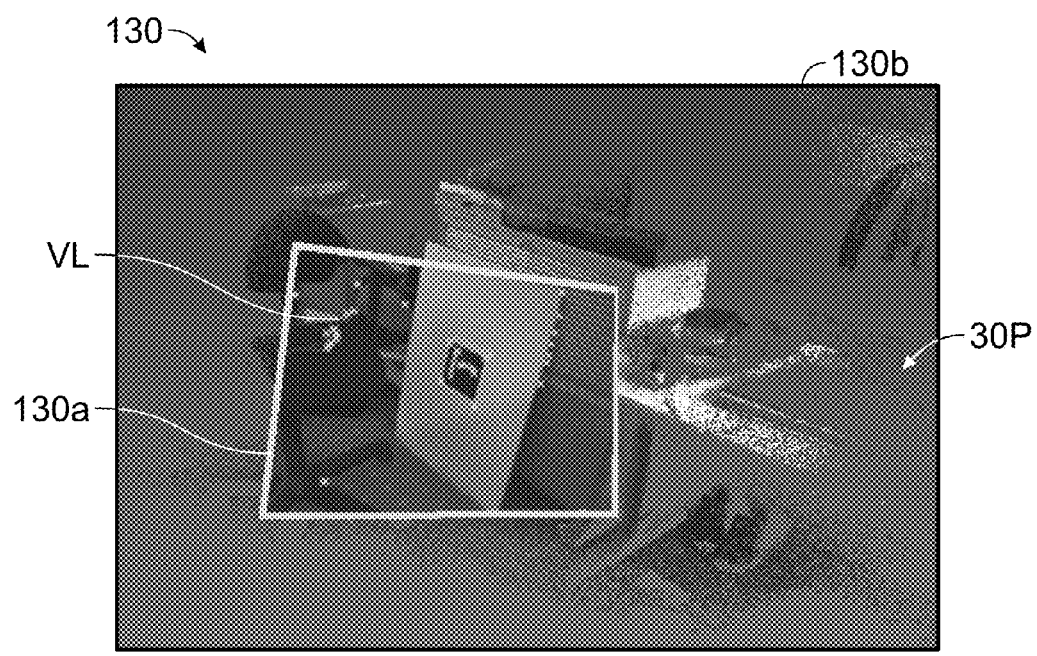
FIG. 10 is a computer generated image of the display of FIG. 7 or FIG. 9.

It should be appreciated that the placement of the image of the three-dimensional point cloud 3DP around the periphery of the video live image VL provides advantages in allowing the user to easily see where additional scanning may be required without taking their eyes off of the display 130. In addition it may be desirable for the user to determine if the computational alignment of the current camera position to the already acquired 3D data is within a desired specification. If the alignment is outside of specification, it would be noticed as discontinuities at the border between the image and the three-dimensional point cloud 3DP. Referring now to FIG. 9, it can be seen that during a scanning operation some areas, such as areas 140, 142 have a high density of points that allow for a representation of an object at a desired accuracy level. The user will be able to observe that other areas, such as areas 144, 146 have lower point densities. The user may then determine whether additional scanning needs to be performed. For example, area 144 may be a table top where a generally low density of points may be acceptable. The user may determine that other areas, such as area 146 for example, may require additional scanning since the object has not been completely captured. FIG. 10 illustrates a computer generated image of a scanning process, it should be appreciated that the image of the three-dimensional point cloud 3DP is variable and continuously changes, which could make it difficult for a user to determine when additional scanning is needed. Thus the video live image VL and the image of the three-dimensional point cloud 3DP cooperate to guide the user during the scanning process.

The image acquired by the camera 113 is a two-dimensional (2D) image of the scene. A 2D image that is rendered into a three-dimensional view will typically include a pin-cushion-shaped or barrel-shaped distortion depending on the type of optical lens used in the camera. Generally, where the field of view (FOV) of the camera 113 is small (e.g. about 40 degrees), the distortion is not readily apparent to the user. Similarly, the image of the three-dimensional point cloud data may appear distorted depending on how the image is processed for the display. The point cloud data 3DP may be viewed as a planar view where the image is obtained in the native coordinate system of the scanner (e.g. a spherical coordinate system) and mapped onto a plane. In a planar view, straight lines appear to be curved. Further, the image near the center-top and center-bottom edges (e.g. the poles) may be distorted relative to a line extending along the midpoint of the image (e.g. the equator). Further, there may also be distortions created by trying to represent a spherical surface on a rectangular grid (similar to the Mercator projection problem).

It should be appreciated that it is desired to have the images within the first display part 130a appear to be similar to that in the second display part 130b to provide a continuous and seamless image experience for the user. If the image of three-dimensional point cloud 3DP is significantly distorted, it may make it difficult for the user to determine which areas could use additional scanning. Since the planar image of the point cloud data 3DP could be distorted relative to the 2D camera image, one or more processing steps may be performed on the image generated from the point cloud data 3DP. In one embodiment, the field of view (FOV) of the second display part 130b is limited so that only the central portion of the planar image is shown. In other words, the image is truncated or cropped to remove the highly distorted portions of the image. Where the FOV is small (e.g. less 120 degrees), the distortion is limited and the planar view of the point cloud data 3DP will appear as desired to the user. In one embodiment, the planar view is processed to scale and shift the planar image to provide to match the camera 113 image in the first display part 130a.

In another embodiment, the three-dimensional point cloud data 3DP is processed to generate a panoramic image. As used herein, the term panoramic refers to a display in which angular movement is possible about a point in space (generally the location of the user). A panoramic view does not incur the distortions at the poles as is the case with a planar view. The panoramic view may be a spherical panorama that includes 360 degrees in the azimuth direction and +/−45 degrees ion the zenith. In one embodiment the spherical panoramic view may be only a portion of a sphere.

In another embodiment, the point cloud data 3DP may be processed to generate a 3D display. A 3D display refers to a display in which provision is made to enable not only rotation about a fixed point, but also translational movement from point to point in space. This provides advantages in allowing the user to move about the environment and provide a continuous and seamless display between the first display part 130a and the second display part 130b.

In one embodiment, the video live image VL in the first display part 130a and the image of the three-dimensional point cloud 3DP in the second display part 130b match together seamlessly and continuously (with respect to the displayed contents). A part of the three-dimensional point cloud 3DP is first selected (by the control and evaluation device 122) in such a way, as it is regarded from the perspective of the 2D camera 113 or at least from a position aligned with the 2D camera 113. Then, the selected part of the three-dimensional point cloud 3DP is selected in such a way that it adjoins continuously the video live image VL. In other words, the displayed image of the three-dimensional point cloud 3DP becomes a continuation of the video live image VL for the areas beyond the field of view of the 2D camera 113 on the left, on the right, top and bottom relative to the field of view of the 2D camera). As discussed above, the selected portion of the three-dimensional point cloud 3DP may be processed to reduce or eliminate distortions. In other embodiments, the representation may correspond to the representation of a fish-eye lens, but preferably it is undistorted. The part of the three-dimensional point cloud 3DP which is located in the area occupied by the first display part 130a, in other words the portion beneath or hidden by the video live image VL, is not displayed.

It should be appreciated that the density of the points in the three-dimensional point cloud 3DP in the area where the first display part 130a is located will not be visible to the user. Normally, the video live image VL is displayed using the natural coloring. However, in order to indicate the density of the points in the area covered/behind by the video live image VL, the coloring of the video live image VL may be changed artificially such as by overlaying for example. In this embodiment, the artificial color (and, if appropriate, the intensity) used for representing the artificially colored video live image VL corresponds to the density of the points. For example, a green coloring to the video live image VL may indicate a (sufficiently) high density while a yellow coloring may be used to indicate a medium or low point density (e.g. areas which still the scan data can be improved). In another embodiment, the distant-depending precision of the data points could be displayed using this color-coding.

To support the registration of the 3D scans, flags or marks 133 (FIG. 7 and FIG. 8) may be inserted in the first display part 130a to indicate structures (i.e. possible targets) recognized by the control and evaluation device 122. The marks 133 may be a symbol, such as a small "x" or "+" for example. The recognizable structures can be points, corners, edges or textures of objects. The recognizable structures may be found by the latest 3D scan or the video live image VL being subjected to the beginning of the registering process (i.e. to the localization of targets). The use of the latest video live image VL provides advantages in that the registration process does not have to be performed as frequently. If the marks 133 have a high density, it is considered to be a successful registration of the 3D scans. If, however, a lower density of the marks 133 is recognized, additional 3D scans may be performed using a relatively slow movement of the 3D measuring device 100. By slowing the movement of the device 100 during the scan, additional or higher density points may be acquired. Correspondingly, the density of the marks 133 may be used as a qualitative measure for the success of the registration. Similarly, the density of the points of the three-dimensional point cloud 3DP may be used to indicate a successful scan. As discussed above, the density of points in the scan may be represented by the artificial coloring of the video live image VL.

The movement of the 3D measuring device 100 and processing of the captured frames may also be performed by a tracking function, i.e. the 3D measuring device 100 tracks the relative movement of its environment with the methods used during tracking. If tracking gets lost, for example, if the 3D measuring device 100 has been moved too fast, there is a simple possibility of reassuming tracking. In this embodiment, the video live image VL as it is provided by the 2D camera 113 and the last video still image from tracking provided by it may be represented adjacent to each other in a side by side arrangement on the display 130 for the user. The user may then move the 3D measuring device 100 until the two video images coincide.

In one embodiment, the 3D measuring device 100 may be controlled based on movements of the device 100. These movements or gestures by the user can also be used for controlling the representation of the video image VL or of the three-dimensional point cloud 3DP. In one embodiment, the scale of representation of the video image VL and/or of the three-dimensional point cloud 3DP on the display 130 may depend on the speed and/or acceleration of the movement of the 3D measuring device 100. The term "scale" is defined as the ratio between the size (either linear dimension or area) of the first display part 130a and the size of the complete display 130, being denoted as a percentage.

A small field of view of the 2D camera 113 is assigned to a small scale. In the present embodiment with a subdivided display 130 with a central first display part 130a showing the video live image VL, this first display part 130a then may be of smaller size than in the standard case, and the second display part 130b (about the periphery of the first display part 130a) shows a bigger part of the three-dimensional point cloud 3DP. A larger field of view is assigned to a large scale. In one embodiment, the video live image VL may fill the whole display 130.

In the event of high speeds of movement of the 3D measuring device 100 are detected, the scale of the representation may be configured smaller than with low speeds and vice versa. Similarly, this may apply to accelerations of the movement of the 3D measuring device 100. For example, the scale of the displayed image is reduced in the case of positive accelerations, and the scale is increased in the case of negative accelerations. The scale may also depend on a component of the speed and/or acceleration of the movement of the 3D measuring device 100, for example on a component which is arranged perpendicular or parallel to the alignment of the 3D measuring device 100. If the scale is determined based on a component of the movement, parallel to the alignment (i.e. in the direction of the alignment), the scale can also be made dependent on the change of an average distance to objects O from the 3D measuring device 100.

In some embodiments, the change of the scale due to movement, a standstill of the movement of the 3D measuring device 100 or a threshold speed of movement value not being achieved can be used to record a sequence of still images of the camera 113 with a low dynamic range. These images may be captured at low dynamic range but with different exposure times or illumination intensities within the sequence to generate a high dynamic range image therefrom.

In some embodiments, the direction of gravity may be defined at the beginning of the registration process by a defined movement of the 3D measuring device 100. This defined movement is carried out by the user by moving the device 100 in a vertical upward and downward movement for example. In other embodiments, the direction of gravity may be determined from a set of statistics of all movements during the registration process. A plane may be averaged from the coordinates of the positions taken by the device 100 while recording process along a path of movement through space. It is assumed that the averaged plane is located horizontally in space, meaning that the direction of gravity is perpendicular to it. As a result, the use of inclinometer 119 for determining the direction of gravity may be avoided.

The evaluation of the coordinates of the positions may also be used for determining the kind of scene and, if appropriate, to offer different representations or operating possibilities. A path of movement around a center location (with an alignment of the 3D measuring device 100 oriented towards the interior), suggests an image of a single object O (object-centered image). Similarly, a path of movement that orients the device 100 towards the outside (and particularly longer straight sections of the path of movements) makes reference to an image of rooms. Thus, where it is determined that a room is being scanned, an image of a floor plan (top view) may be inserted into the display 130.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A hand-held scanner for producing 3D scans of an object in an environment, the scanner comprising:
   a carrying structure having a front side and a reverse side, the carrying structure having a first arm, a second arm and a third arm arranged in a T-shape or a Y-shape, the front side of the carrying structure having a concave curvature;
   a first protective element coupled to the carrying structure at a first end of and extending outward from the first arm, a second protective element coupled to the carrying structure at a second end of and extending outward from the second arm, and a third protective element coupled to the carrying structure at a third end of and extending outward from the third arm;
   a housing coupled to the reverse side having a handle, the handle being positioned opposite the carrying structure, the housing and the carrying structure defining an interior space;
   at least one projector configured to project at least one pattern on the object, the at least one projector being positioned within the interior space and oriented to project the at least one pattern from the front side;
   at least two cameras are spaced apart from each other, the at least two cameras being configured to record images of the object, the at least two cameras being disposed within the interior space and oriented to record images through the front side, the at least two cameras and the at least one projector being spaced apart by a predetermined distance from each other by the carrying structure;
   wherein upon resting the hand-held scanner front side down on a flat surface, the concave curvature of the front side cooperates with the first, second and third protective elements to define a clearance between the flat surface and the front side.

2. The hand-held scanner of claim 1 wherein:
   the at least two cameras includes a first camera coupled to the first arm and a second camera coupled to the second arm; and
   the at least one projector is coupled to the third arm.

3. The hand-held scanner of claim 1 further comprising a color camera disposed at an intersection of the first arm, the second arm and the third arm.

4. The hand-held scanner of claim 3 further comprising a control actuator disposed on the housing opposite the carrying structure.

5. The hand-held scanner of claim 4 further comprising status lamps disposed about the control actuator.

6. The hand-held scanner of claim 1 wherein the concave curvature of the carrying structure is a spherical curvature having a radius between 1 to 3 meters.

7. The hand-held scanner of claim 1 wherein a first angle between the first arm and the second arm is between 130-170 degrees.

8. The hand-held scanner of claim 7 wherein the first angle is 150 degrees.

9. The hand-held scanner of claim 7 wherein a second angle between the first arm and the third arm is 95-115 degrees.

10. The hand-held scanner of claim 9 wherein the second angle is 110 degrees.

11. The hand-held scanner of claim 9 wherein the third arm is longer than the first arm and the second arm.

12. The hand-held scanner of claim 1 wherein the housing is coupled to the carrying structure by a floating connection.

13. The hand-held scanner of claim 12 wherein the floating connection comprises an elastomeric seal disposed between an outer perimeter of the carrying structure and the housing.

14. The hand-held scanner of claim 1 wherein the carrying structure is made from a fiber-reinforced synthetic material selected from a group consisting of a carbon-fiber-reinforced synthetic material, a glass-fiber-reinforced synthetic material and fiber-reinforced ceramics.

15. The hand-held scanner of claim 2 wherein the first camera has a first field of view and the second camera has a second field of view, the first field of view overlapping with the second field of view.

16. The hand-held scanner of claim 15 wherein:
   at least one of the first camera and the second camera are pivotally coupled to the carrying structure; and
   an amount of overlap between the first field of view and the second field of view is adjustable by pivoting the first camera or the second camera.

17. The hand-held scanner of claim 1 further comprising a light source disposed within the interior space at an intersection of the first arm, the second arm and the third arm.

18. The hand-held scanner of claim 3 further comprising:
   a light source disposed within the interior space adjacent the color camera; and
   a radiating element coupled to the front side and disposed about the color camera, the radiating element configured to emit light from the light source onto the object.

* * * * *